United States Patent [19]

Bolt

[11] Patent Number: 4,857,246
[45] Date of Patent: Aug. 15, 1989

[54] ALUMINUM NITRIDE ARTICLES BY CARBOTHERMAL NITRIDATION

[75] Inventor: John D. Bolt, Landenberg, Pa.

[73] Assignee: E. I. Du Pont de Nemours and Company, Wilmington, Del.

[21] Appl. No.: 146,407

[22] Filed: Jan. 21, 1988

[51] Int. Cl.$^4$ .............................................. C04B 35/58
[52] U.S. Cl. ................................... 264/29.2; 264/29.1; 264/29.6; 264/29.7; 264/65; 264/66
[58] Field of Search ................. 264/29.1, 65, 66, 29.2, 264/29.6, 29.7

[56] References Cited

U.S. PATENT DOCUMENTS

| | | | |
|---|---|---|---|
| 3,529,044 | 2/1968 | Santangelo | 264/29.1 |
| 3,846,527 | 11/1974 | Winter et al. | 264/63 |
| 4,010,233 | 3/1977 | Winter et al. | 264/63 |
| 4,126,652 | 11/1978 | Oohara et al. | 264/29.6 |
| 4,578,365 | 3/1986 | Huseby et al. | 264/65 |
| 4,686,070 | 8/1987 | Maguire | 264/65 |

FOREIGN PATENT DOCUMENTS

| | | |
|---|---|---|
| 839321 | 4/1970 | Canada . |
| 0213629A2 | 1/1986 | European Pat. Off. . |
| 61-124626 | 6/1986 | Japan . |
| 1514171 | 1/1974 | United Kingdom . |

OTHER PUBLICATIONS

Ceramic Powders P Vincenzini ed., p. 403-412 (1983).
Sov. Powder Metal, 23(11) 829-832 (1984).
Yogyo Kyokaishi 82 p-181-3 (1974).
Rev. Chim. Miner 22 534-45 (1985).
Inoue et al., Ain Ceramics with High Thermal Cond. Proc. of Annual Meetings of Ceramic Soc. of Japan, May 22-24, 1985, pp. 513-514.
Anzai et al., Ain Ceramics with High Thermal Cond. Proc. of Annual Meeting of Ceramic Soc of Japan, May 22-24 1985, pp. 515-516.
Shinozaki et al., Ain Ceramics with High Thermal Conductivity; Proc. of Annual Meeting of the Ceramic Soc. of Japan May 22-24, 1985, pp. 517-518.
Tamamizu et al., Behavior of Yttrium Oxide on Sintering of Ain Proc. of Annual Meeting of the Ceramic Soc. of Japan May 22-24, 1985, pp. 675-676.

Primary Examiner—James Derrington

[57] ABSTRACT

Aluminum nitride fibers or films are made by carbothermal nitridation of precursor fibers or films which contain a source of alumina and a source of carbon. Improved articles are obtained by providing a stoichiometric excess of carbon, by stabilizing the precursor prior to carbonization and nitridation, by removing excess carbon after nitridation and introducing a sintering aid to promote densification of the final structure.

10 Claims, No Drawings

ALUMINUM NITRIDE ARTICLES BY CARBOTHERMAL NITRIDATION

BACKGROUND OF THE INVENTION

Shaped articles of aluminum nitride, especially fibers thereof, are sought because they possess high thermal conductivity; hence, are useful in electronic applications where heat dissipation is necessary. Thermal conductivity may be an order of magnitude higher than that of alumina but depends critically on material purity. These considerations are discussed in great detail in, e.g., U.S. Pat. No.4,578,365, wherein the preparation of bulk ceramic articles of aluminum nitride is discussed.

Fibers composed nominally of aluminum nitride may be prepared by a number of prior art methods. U.S. Pat. Nos. 3,529,044; 3,653,830; 3,846,527; 4,010,233; 4,126,652; Can. No. 839,321; G.B. No. 1,514,171 and Jap. Appl'n. No. 61/124,626 are illustrative. In one reaction utilizing inexpensive raw materials, alumina and carbon, or an organic precursor thereof, are heated at elevated temperatures in the presence of nitrogen, whereupon aluminum nitride is formed. This is a classic text-book reaction and is described in detail in E.P. No. 0213 629. However, this reaction requires careful stoichiometric control and often results in excess carbon or unconverted alumina, either of which impacts dramatically on thermal conductivity. In fiber form, incomplete sintering (densification) or excessive grain growth can also result, either of which results in inferior fibers. Accordingly, it is the object of this invention to produce aluminum nitride articles, especially fibers, by the in-situ carbothermal reductive nitridation of alumina in a manner permitting optimization of purity and microstructure, to provide thereby strong fibers which are highly conductive of heat.

SUMMARY OF THE INVENTION

Aluminum nitride fibers or films are produced by carbothermal nitridation of a precursor fiber or film which contains a source of alumina and a source of carbon, followed by sintering to densify the fiber or film. The precursor fiber or film must be stabilized prior to exposure to the high temperatures at which carbonization and nitridation occur. This stabilization is accomplished by exposing the precursor fiber or film to a temperature of from 200°-400° C., preferably 200°-300° C. in the presence of oxygen. The possibility of having unreacted alumina in the final product is avoided by providing an excess of carbon in the carbonized fiber or film. The mole ratio of carbon to alumina in the carbonized fiber or film should be in the range of 3.0 to 4.2, preferably 3.1 to 3.5. Note that the process of carbonization may remove some carbon from the precursor, so the ratio of components incorporated in the precursor must be adjusted accordingly. The excess carbon present in the nitrided fiber or film is removed by heating the nitrided fiber or film to a temperature of from 500°-750° C., preferably 600°-650° C. in the presence of oxygen for from 1 to 60 minutes. The nitrided and decarbonized fibers and films are relatively porous, and must be sintered to convert them to dense structures. In order to accomplish sintering, the fibers or films must contain a sintering aid in an amount up to 7% by weight based on aluminum nitride. The sintering aid can be incorporated in the decarbonized fiber or film by applying a solution of the dissolved sintering aid source to the decarbonized fiber or film. The solvent used should be one that does not degrade the fiber or film. Preferably, the source of sintering aid can be incorporated in the precursor fiber or film. The compound selected should be one that does not interfere with the carbonization and nitriding reactions. Further, it is preferred that the nitriding reaction conditions deactivate the sintering aid so that no sintering occurs prior to decarbonization. The de-carbonizing and sintering conditions should then convert the material to the active sintering aid. Preferred sintering aids are oxides of alkaline earth and rare earth metals. Thus, oxides, halides, acetates, carbides, carbonates, nitrates, nitrides, nitrites, hydroxides, oxalates, borides, and hydrides of alkaline earth and rare earth metals can be employed can be applied as sintering aid sources. Calcium and yttrium oxides are the preferred sintering aids, so the oxides, halides, acetates, carbides, carbonates, nitrates, nitrides, nitrites, hydroxides, oxalates, borides, and hydrides of yttrium and calcium are preferred sintering aid sources.

Nitridation takes place at a temperature of 1550°-1800° C. in the presence of nitrogen.

Precursor fibers and films are made by methods well known in the art. Preferred carbon sources are polyacrylonitrile and petroleum pitch. Spinning a fiber from pitch may be facilitated by incorporating in the pitch a linear organic polymer, such as polystyrene.

The fibers or films made by the process of this invention are generally useful in composites wherein the matrix may be a ceramic, metal or plastic. They are especially useful in laminates for circuit boards wherein the selective and/or directional dissipation of heat is required. Such fibers are from 5 to 125 or preferably 10 to 25 microns (micrometers) in diameter, and they are polycrystalline.

DETAILED DESCRIPTION OF THE INVENTION

Precursor fibers and shaped articles may be formed from dispersions of alumina source in the carbon source as is well-known in the art. Three general methods for preparing fibers are wet, dry and melt spinning, the lattermost being preferred. Films may be cast from wet- or dry-spinning dispersions or may be extruded from such dispersions or from the preferred melts per se. Fibrids are conveniently prepared by shear precipitation from such dispersions. For polymer-assisted wet or dry spinning, homo- or copolymeric poly(acrylonitrile), (PAN), is the preferred ingredient source of carbon. Petroleum pitch is a well-known source of carbon and, when obtained in the isotropic form (lower carbon yield than mesophase), greater amounts may be used in order fulfill stoichiometric requirements more easily and simplify the dispersion of alumina therein. Other organic polymers are suitable sources of carbon as is known in the art. See for example, D. J. O'Neil, Intern. J. Polymeric Mater. 7 (1979) pp.203-218. Alumina itself may be considered an alumina source. The alumina employed is preferably provided as high purity, small particle size material, such as Alcoa A-16 or Sumitomo AK50, which eliminate the need for expensive classification procedures. Materials that convert to alumina under the carbonization and nitridation conditions include basic aluminum salts such as aluminum chlorohydrate, and even compounds such as aluminum tartrate, which are capable of providing both alumina and carbon upon heating. The stoichiometry of these systems must be carefully considered, taking into account the conditions of subsequent stabilization and carbonization steps, in order to provide the required excess of elemental carbon to ensure the complete conversion of alumina to aluminum nitride.

Subsequent to spinning (or casting, etc.) is the stabilization step required to infusabilize pitch, cross-link the PAN, etc. so that subsequent processing at higher temperatures may be carried out without loss of integrity due to melting, burning and the like. This step is well-known in the preparation of pitch carbon fibers, the conversion of PAN fibers to carbon fibers or in the general use of PAN or other organic materials as spinning assistants and/or an in-situ source of carbon. Generally the stabilization step is carried out in the presence of oxygen (including in the presence of air) in the temperature range of from 200° C. to 400° C. and is carried out for a time sufficient to ensure complete infusabilization. Temperatures may be "ramped" from low to high to achieve the best time-temperature profile Note that in this and the subsequent heating operations, each step may be batch or continuous, and that one or more steps may be combined. Optionally the fibers may be devolatilized or "precarbonized" following stabilization in order to eliminate gaseous materials, e.g. The oxygen of stabilization and/or the by-products of the carbon-forming reactions, in a controlled manner that minimizes void formation. This step usually is conducted at 800°–1000° C. in an inert atmosphere and optionally may be followed by "carbonization" at 1000°–1200° C. to complete the conversion of the precursor materials to carbon. Both optional steps may be combined with the essential step of nitridation.

Stabilized and carbonized shaped precursor articles contain the ingredients of alumina and carbon in amounts sufficient to produce a stoichiometric excess of the latter. Conversion of alumina to aluminum nitride in accordance with this invention is ensured by a stoichiometric excess of carbon. On a molar basis, in excess of 3.0 moles of carbon per mole of alumina is needed, and amounts of carbon up to 4.2 moles per mole of alumina may be employed. At higher carbon levels, formation of strong void free fibers becomes more difficult. A carbon to alumina ratio of 3.1 to 3.5 moles per mole of alumina is preferred, in order to simplify the later oxidative removal of the excess. If the carbon source is an organic polymer, e.g., PAN, then carbon yields can be estimated thermogravimetrically and confirmed experimentally. Actual carbon yields can vary, depending on heating rates, holding times, sweep rates of gasses and the like. The similar considerations apply to pitches as a source of elemental carbon.

The alumina-carbon mixture is converted to aluminum nitride in the process step termed "nitridation" by heating such articles in an atmosphere of nitrogen to temperatures that exceed about 1500° C. The preferred temperature range is 1550°–1800° C. Under these conditions one mole of alumina reacts with three moles of carbon and one mole of nitrogen to produce two moles of aluminum nitride and three moles of carbon monoxide. The sintering aid that is present at this point may also be converted to the corresponding nitride, thereby rendering it ineffective. The nitridation reaction proceeds faster at higher temperatures but so does the formation of aluminum oxynitride. Times at such higher temperatures also should be minimized in order to prevent premature sintering which, at this stage of processing, would be at best incomplete and, more likely, excessive and irreversible particle size growth and/or carbon entrapment could occur. Nitridation occurs in the presence of nitrogen. The nitrogen can be mixed with other gasses which are inert in the reaction. Ammonia can also be used. The reaction proceeds quickly and may be completed is 0.1 to 15 minutes.

As noted above, excess carbon is present in the fiber or film prior to nitridation in order to ensure complete conversion of alumina to aluminum nitride. However, unreacted carbon can deactivate sintering aid in the fiber, and can decrease thermal conductivity of the final product. Thus it is necessary to remove the carbon and to reactivate any sintering aid present prior to the sintering step. This is accomplished by heating the article in the presence of oxygen. In the case of the preferred melt-spun fibers (see Example 1) they are gray in color after nitridation indicating the presence of carbon. After oxidizing at 600° C. for about 45 minutes, they are white. Prior to oxidizing, the fibers would not sinter, but oxidizing then sintering in nitrogen at 1760° C. for about 5 minutes, produces fibers which exhibit a dense polycrystalline microstructure. Success at this stage apparently results from the fact that carbon is easier to oxidize than is aluminum nitride and that a protective surface layer of aluminum oxide and/or aluminum oxynitride may limit diffusion of oxygen into the aluminum nitride particles, thereby confining the oxidation to the more reactive species. It follows that control of time and temperature during this step is the most important in the overall procedure. Accordingly, temperatures of 500°–750° C. or preferably 600°–650° C. are recommended. The atmosphere may be dry air or oxygen and times from 1–60 minutes are recommended.

Sintering aids can be introduced into the fiber or film either before or after the decarbonization step by contacting the fibers with a solution of sintering aid or a compound which will yield a sintering aid as a result of the decarbonizing and sintering conditions. Thus, the preferred compounds for use at this stage would be those which are soluble in a convenient solvent such as alcohol. However, the fibers and films are brittle prior to sintering. Thus incorporation of a sintering aid source in the precursor fiber or film is preferred. This also provides the best dispersion of sintering aid in the fiber or film. The sintering aid source, if inactivated by the conditions of nitridation need not necessarily be reactivated only by the decarbonizing conditions. If some oxygen is incorporated into the fiber, even if only as partially oxidized aluminum nitride, then a mixed oxide phase which is liquid at sintering temperatures forms to promote sintering.

Sintering occurs in an inert atmosphere at temperatures above about 1500° C. Temperatures and times should be selected to ensure maximum densification while minimizing grain growth.

EXAMPLE 1

40 g of Alcoa A-16 alumina, 320 ml of tetrahydrofuran (THF), 0.8 ml of oleic acid and 0.4 g of yttrium oxide were ball milled overnight to obtain a uniform slurry. The slurry was placed in a flask with an additional 100 ml of THF and 25.8 g of isotropic petroleum pitch was added. After heating to reflux for 15 min., it was cooled and the solvent was removed under reduced pressure in a rotary evaporator. The pitch, "Ashland Aerocarb", had an elemental composition of 92.18% C, 5.14% H, 1.06% O, 0.19% N, and 1.36% S, and a TGA yield in nitrogen of 55% when heated at 20° C./min. to 1100° C. To 20 g of the pitch-alumina blend in 100 ml of tetrahydrofuran was added 2.0 g of polystyrene (MW=250,000–300,000). Solvent was again removed under vacuum. Fibers were prepared from the polymer pitch-alumina blend by melt spinning through a 0.005 in. spinneret hole at 210 C. Fibers were stabilized as a skein by heating in air at 0.5° C./min to 265° C. and holding at 265° C. for 96 minutes. Subsequently the fibers were carbonized and nitrided in nitrogen by heating to 1767° C. The gray fibers were examined in a scanning electron microscope (SEM) revealing a porous microstructure composed of densely packed submicron particles. The fibers were subsequently oxidized in air by heating at 600° C. for 45 min., converting them to a white color. These fibers were then sintered in nitrogen by heating to 1763° C. SEM examination showed fibers about 10 microns in diameter with a dense polycrystalline microstructure. The AlN fibers which had been oxidized and sintered contained 0.37% carbon by weight. A control sample which was not oxidized before re-heating to 1763° C. did not sinter; it contained 6.07% carbon.

EXAMPLE 2

A dispersion of alumina in a polyacrylonitrile copolymer solution was prepared by ball milling Alcoa A-16 alumina in DMF (dimethylformamide) containing a small amount of polyacrylonitrile copolymer overnight, pouring the resulting slurry into a resin kettle, cooling to 0° C., and adding additional copolymer to give a final mixture containing 14.3% A-16 alumina, 11.7% copolymer, and 74% DMF by weight. The cooled slurry was stirred vigorously and warmed slowly to 110° C. and stirred for several hours. The dispersion was degassed by applying vacuum as it cooled to room temperature. [The polyacrylonitrile copolymer had an inherent viscosity of 1.4 in DMF ( at 30° C. and 0.5 wt.%) and contained approximately 96% by weight acrylonitrile and 4 % styrene sulfonate (two thirds ammonium salt, one third sodium salt).] This dispersion was wet-spun by extruding at 0.4 ml/min through a single round capillary 0.01 inch in diameter and 0.01 inch long into a coagulation bath containing 60% by volume DMF and 40% water at room temperature. The fiber was wound-up at 20 m/min. and stored on the wind-up bobbin immersed in the coagulant solution. The fiber was drawn 3X in boiling water. The resulting polyacrylonitrile-alumina fiber was oxidatively stabilized by heating a skein in air at 4° C./min. to 200° C. then at 2° C./min. to 320° C. and holding at 320° C. for 16 min. The fibers were then pyrolyzed and converted to aluminum nitride by heating to 1670° C. in nitrogen. The fibers appeared porous when examined in the scanning electron microscope; they were slightly oval in cross-section with typical diameters of 25 to 40 microns. The fibers contained 2.9% by weight carbon.

The aluminum nitride fibers just described were further sintered after application of sintering aids: A solution of calcium nitrate was prepared by dissolving calcium nitrate hydrate in absolute ethanol at 5% by weight, adding benzene and distilling out the benzene-water azeotrope. A short skein of the aluminum nitride fiber was dipped into the solution while it was still hot, removed, padded dry to remove excess solution, and dried in a vacuum oven. Similarly a solution of yttrium chloride was made anhydrous and applied to a separate skein of aluminum nitride fiber. These fibers were sintered by heating in nitrogen to 1615° C. Examination in the scanning electron microscope showed significant sintering of both samples with the majority of remaining voids in the centers of the fibers. X-ray powder diffraction of the resulting fibers showed aluminum nitride to be the major phase in both samples.

I claim:

1. In a process for producing aluminum nitride fibers or films by carbonizing and nitriding a precursor fiber or film comprising a source yielding carbon and a source yielding alumina, and sintering the nitrided fiber or film in an inert atmosphere, the improvement comprising:
    (a) stabilizing the precursor fiber or film at a temperature of 200°–400° C. prior to carbonizing;
    (b) providing sufficient carbon source in the precursor fiber or film such that the mole ratio of carbon to alumina in the carbonized fiber or film is from 3.0–4.2;
    (c) heating the nitrided fiber or film at a temperature of 500°–750° C. in the presence of oxygen for from 1 to 60 minutes to remove excess carbon; and
    (d) incorporating a sintering aid source in the fiber or film prior to sintering such that the sintering aid will be present in an amount up to 7% by weight based on AlN in the fiber or film.

2. The process of claim 1 wherein the sintering aid source is incorporated in the precursor fiber or film.

3. The process of claim 2 wherein the sintering aid source is a member selected from the group consisting of the oxides, halides, acetates, carbides, carbonates, nitrates, nitrides, nitrites, hydroxides, oxalates, borides, and hydrides of alkaline earth and rare earth metals.

4. The process of claim 2 wherein the sintering aid source is selected from the group consisting of the oxides, halides, acetates, carbides, carbonates, nitrates, nitrides, nitrites, hydroxides, oxalates, borides, and hydrides of yttrium and calcium.

5. The process of claim 1, 2, 3 or 4 wherein the ratio of carbon to alumina in the carbonized fiber is from 3.1–b 3.5.

6. The process of claim 1, 2 ,3 or 4 wherein the fiber or film is nitrided at 1550°–1800° C.

7. The process of claim 1, 2, 3 or 4 wherein the precursor fiber or film is stabilized at a temperature of 200°–300° C.

8. The process of claim 1, 2, 3 or 4 wherein excess carbon is removed at a temperature of 600°–650° C.

9. The process of claim 1, 2, 3 or 4 wherein the carbon source is selected from the group consisting of polyacrylonitrile and petroleum pitch.

10. The process of claim 9 wherein the ratio of carbon to alumina in the carbonized fiber is from 3.1–3.5, the fiber or film is nitrided at 1550°–1800° C., the precursor fiber or film is stabilized at a temperature of 200°–300° C., and wherein excess carbon is removed at a temperature of 600°–650° C.

* * * * *